(12) United States Patent
Goldman et al.

(10) Patent No.: US 8,391,460 B2
(45) Date of Patent: Mar. 5, 2013

(54) MID-CALL HAND-OFFS IN TELECOMMUNICATION NETWORKS

(75) Inventors: Stuart O. Goldman, Scottsdale, AZ (US); Kevin M. Patfield, Phoenix, AZ (US)

(73) Assignee: Alcatel Lucent, Paris (FR)

( * ) Notice: Subject to any disclaimer, the term of this patent is extended or adjusted under 35 U.S.C. 154(b) by 1996 days.

(21) Appl. No.: 11/165,364

(22) Filed: Jun. 23, 2005

(65) Prior Publication Data

US 2007/0004410 A1    Jan. 4, 2007

(51) Int. Cl.
*H04M 3/42* (2006.01)

(52) U.S. Cl. ............... 379/212.01; 379/202.01

(58) Field of Classification Search ............. 379/215.01, 379/212.01, 202.01, 142.06, 142.08, 207.15
See application file for complete search history.

(56) References Cited

U.S. PATENT DOCUMENTS

| | | | |
|---|---|---|---|
| 5,604,791 A * | 2/1997 | Lee | 379/88.21 |
| 5,619,561 A * | 4/1997 | Reese | 379/142.08 |
| 6,611,688 B1 | 8/2003 | Raith | |
| 6,853,718 B1 | 2/2005 | Bedingfield, Sr. et al. | |
| 6,999,769 B1 | 2/2006 | Henon | |
| 7,369,117 B2 * | 5/2008 | Evans et al. | 345/156 |
| 2005/0074111 A1 * | 4/2005 | Hanson et al. | 379/212.01 |
| 2006/0077957 A1 | 4/2006 | Reddy et al. | |
| 2006/0178173 A1 * | 8/2006 | Miller | 455/575.1 |
| 2007/0269027 A1 * | 11/2007 | Lynam et al. | 379/88.2 |
| 2008/0310371 A1 | 12/2008 | Russell | |

* cited by examiner

*Primary Examiner* — Rasha Al Aubaidi
(74) *Attorney, Agent, or Firm* — Fay Sharpe LLP

(57) ABSTRACT

A method of supporting a mid-call hand-off feature (22) is provided in a telecommunications network (40). The method includes: connecting a first call through a first switching facility (20) of the telecommunications network (40), the first call being connected between a first party served by the first switching facility (20) and a second party; receiving a second call at the first switching facility (20) for the first party while the first party is still connected to the first call; determining where the second call originated from; and, selectively connecting the second party to the second call in response to the determined origin of the second call.

20 Claims, 3 Drawing Sheets

MID-CALL HAND-OFFS IN TELECOMMUNICATION NETWORKS

FIELD

The present inventive subject matter relates to the telecommunication arts. Particular application is found in conjunction with certain types of telecommunication networks, and the specification makes particular reference thereto. However, it is to be appreciated that aspects of the present inventive subject matter are also amenable to other like applications and/or networks.

BACKGROUND

Often a telephone subscriber or user may have access to multiple end user terminals (EUTs), which may each be associated with different networks or services. For example, a user may have a landline telephone at their home and/or one at their office, as well a mobile telephone. Alternately, a user may have multiple mobile telephones, e.g., one for work and one for personal use.

In telecommunications networks, a call forwarding function or service is generally well known. Typically, when a call is placed by a calling party to a called party, e.g., over a public switched telephone network (PSTN), if the called party subscribes to the call forwarding feature or service and it has been previously activated by the called party, then the call is routed not to the directory number (DN) called or dialed by the calling party, but rather, to an alternate DN designated by the called party ahead of time, e.g., when the feature was previously activated. While generally adequate for its intended purpose, traditional call forwarding has certain limitations. For example, the feature is only effective for future calls. That is to say, the service is only effective at rerouting calls placed to the subscriber's DN after the call forwarding feature has been activated. More specifically, the call forwarding feature does not permit the forwarding of a call currently or already in progress.

Nevertheless, there are some times when a user may desire to forward, hand-off or transfer a call already in progress from the current DN to another different DN. In other words, a user may desire, mid-call, to hand-off or transfer a call from the EUT currently being used to participate in the call to another different EUT. Consider, for example, a case where a call is currently in progress between two parties, and assume that one of the parties is using a mobile telephone to participate in the call. At some point during the call, the party on the mobile telephone may desire to have the call switched to a nearby or otherwise accessible landline telephone, e.g., because their mobile signal is getting weak, because they desire better sound quality, because they desire to conserve mobile air time minutes, because their mobile telephone's battery is running low, etc. In another example, a party currently participating in a call on their landline telephone, may desire to continue the call on their mobile telephone so that they can travel freely from the vicinity of their landline telephone, e.g., to run an errand, leave the office, head for a meeting, or for any other reason.

Traditional call forwarding does not accommodate the aforementioned situations. Consequently, the party desiring to switch to another EUT mid-call, typically has to let the other party known of their intent, then the parties hang-up (i.e., end the current call) so that a new call can be established using the other EUT. Such an option or approach, however, can be undesirable. For example, some telephone users may find it inconvenient, it may not be clear which party is to initiate the subsequent new call, or an ill timed intervening call may interrupt the parties' plans for the new call.

Accordingly, a new and improved mid-call hand-off service and/or feature is disclosed that overcomes the above-referenced problems and others.

SUMMARY

In accordance with one exemplary embodiment, a method of supporting a mid-call hand-off feature is provided in a telecommunications network. The method includes: connecting a first call through a first switching facility of the telecommunications network, the first call being connected between a first party served by the first switching facility and a second party; receiving a second call at the first switching facility for the first party while the first party is still connected to the first call; determining where the second call originated from; and, selectively connecting the second party to the second call in response to the determined origin of the second call.

In accordance with another aspect of the present inventive subject matter, a system for supporting a mid-call hand-off feature in a telecommunications network includes: connecting means for connecting a first call through a first switching facility of the telecommunications network, the first call being connected between a first party served by the first switching facility and a second party; receiving means for receiving a second call at the first switching facility for the first party while the first party is still connected to the first call; determining means for determining where the second call originated from; and, bridging means for selectively bridging the second party to the second call in response to the determined origin of the second call.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunications art without further detailed explanation as to their configuration or operation except to the extent they have been modified or altered in accordance with and/or to accommodate the preferred embodiment(s) presented herein.

Figure 1:
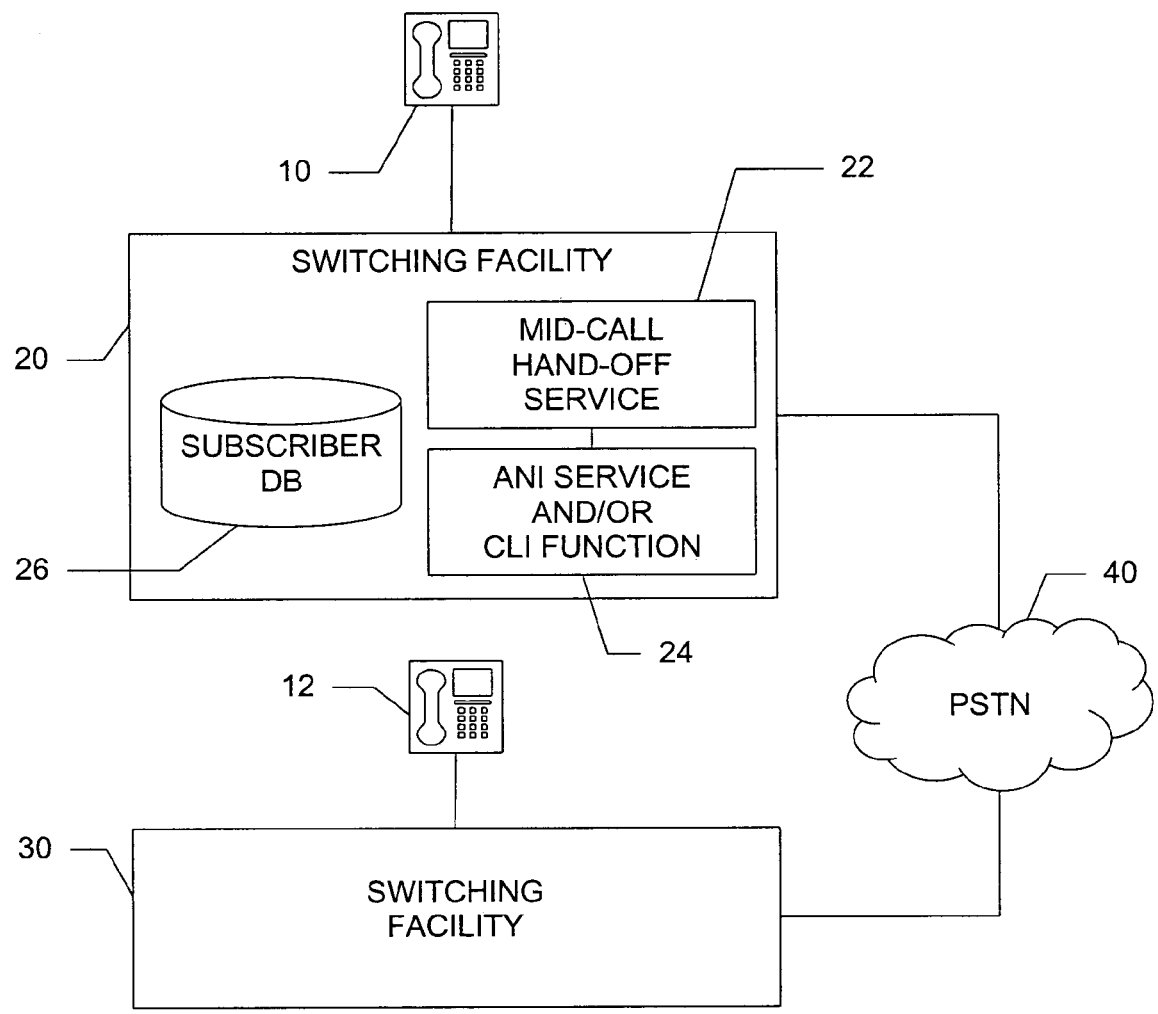
FIG. 1 is a block diagram illustrating an exemplary telecommunications network suitable for practicing aspects of the present inventive subject matter.

With reference to FIG. 1, a first end user terminal (EUT) 10 and a second EUT 12 are selectively employed or used by a user or subscriber to selectively place and/or receive telephone calls over a telecommunications network. Suitably, the EUTs 10 and 12 are in relatively close proximity to one another so that the user can readily access both simultaneously. For example, the EUT 10 may be a mobile terminal carried on the user's person, while the EUT 12 may be a landline terminal at the user's office, home or other location the user frequents. However, not withstanding the forgoing example, it is to be appreciated that, either or both EUTs may be mobile terminals, and either or both may be landline terminals.

As shown, the terminal 10 is served by a telecommunications switching facility 20 that is operatively connected to and/or in communication with a public switched telephone network (PSTN) 40 in the usual manner. Similarly, the terminal 12 is also served by a telecommunications switching facility 30 that is operatively connected to and/or in communication with the PSTN 40 in the usual manner. For simplicity and clarity herein, only two terminals and two switching facilities are illustrated in the present example. However, it is to be appreciated that a single switching facility suitably serves a plurality of end user terminals and that a plurality of switching facilities are similarly equipped and/or likewise arranged with respect to the PSTN 40. In any event, suitably, either of the switching facilities 20 and/or 30 are provided via any one or more of various suitable implementations.

For example, in the case of a landline or wireline application, the served terminal (10, 12) is optionally a landline telephone or other like end user telecommunication device or landline customer premises equipment (CPE), and the facility (20, 30) serving the terminal is an end office (EO) that is operatively connected to the PSTN 40 in the usual manner. Suitably, the EO includes a telecommunications switch (e.g., a class 5 switch such as the 5ESS or another like switch) to which the served terminal (10, 12) is operatively connected in the usual manner, e.g., via a twisted-pair landline cable or the like. Alternately, the switching facility (20, 30) takes the form of or is otherwise implemented as a private branch exchange (PBX) (which when used herein shall also refer to a private automatic exchange (PAX) and/or a private automatic branch exchange (PABX) and/or a Centrex® system) or another like switching facility that provides the served EUT (10, 12) with access to the PSTN 40.

In a wireless or mobile application, e.g., the switching facility (10, 12) serving the terminal (10, 12) is a mobile switching center (MSC) operatively connected to and/or in communication with the PSTN 40 in the usual manner. Suitably, the MSC is also operatively connected to and/or in communication with a plurality of base stations (not shown) in the usual manner. As is understood in the cellular telecommunication art, each base station (BS) provides an over-the-air radio frequency interface for its respective geographic area or cell. Selectively, the served terminal (10, 12) (which in this case is, e.g., a mobile or wireless telephone or other appropriate mobile station (MS)) is provided telecommunication services and/or otherwise accesses the network via the interface and/or the BS serving the cell in which the MS is located. Alternately, the served EUT (10, 12) is a VoIP (Voice over Internet Protocol) or other IP based terminal, and the switching facility (20, 30) serving it includes a wireless local area network (WLAN) or WiFi network that provides wireless extensions of a PBX to the served terminal (10, 12).

As shown, the facility 20 includes or otherwise has access to a mid-call hand-off or transfer service 22 and an optional subscriber database (DB) 26. Additionally, the facility 20 also is equipped with or has access to a service or feature 24 that detects and/or otherwise determines the originating telephone number or directory number (DN) of incoming calls received by the facility 20 for the EUT 10. For example, the originating DN is optionally obtained by the switching facility 20 using automatic number identification (ANI), calling line identity (CLI), or another similar service or feature.

Suitably, the service 22 is only made available to a party or particular EUT if the service 22 is properly subscribed to and/or activated. Accordingly, subscription information is maintained in the DB 26 which is queried by the facility 20 to determine the subscription status of the party and/or the EUT accessing the service 22 prior to permitting invocation of the service 22. For example, the subscriber DB 26 optionally has a list stored therein, and/or otherwise maintains data or information that indicates, which terminals and/or users served by the facility 20 (e.g., identified by their DNs or other like identifiers) do and/or do not subscribe to and/or have activated the mid-call hand-off feature. Suitably, the subscriber and/or activation status for the terminal 10 is so listed or indicated in the subscriber DB 26.

In one exemplary embodiment, the DB 26 is also provisioned with one or more other designated DNs that are optionally stored or otherwise maintained in the DB 26 along with a subscriber's other subscription information. For example, these other DNs correspond to those EUTs the subscriber has designated as potential or allowable candidates to receive a mid-call hand-off. Suitably, the user designates the DNs corresponding to the other EUts owned or frequently used by the user, e.g., such as the EUT 12.

Suitably, the user programs or otherwise provisions the DB 26 and/or the facility 20 with the DN of the EUT 12, e.g., using a mechanism similar to call forwarding or the like. That is to say, the DN of the EUT 12 is optionally provided to the DB 26 and/or the facility 20 by using the EUT 10 to dial or otherwise enter a prescribed feature code followed by the DN of the EUT 12.

Suitably, the user or subscriber (i.e., a first party) uses the terminal 10 to participate in a first call connected through the facility 20 with a second party (not shown). Selectively, the mid-call hand-off service 22 is invoked while the first call otherwise remains in progress, e.g., by the user or first party placing a second call from the EUT 12 to the EUT 10 currently participating in the first call. That is to say, while the first call otherwise remains connected, the user dials the DN of the EUT 10 on or with the EUT 12. Normally (i.e., absent the mid-call hand-off service 22), the switching facility 20 upon receiving the second call for the EUT 10 from the EUT 12 would not connect the second call with the EUT 10. Rather, upon the facility 20 detecting or otherwise observing that the EUT 10 was currently active or participating in another call (namely, the first call), the facility 20 would simply process the second call in the usual manner, e.g., by providing a busy signal or other like call progress tones to the EUT 12, by forwarding the second call to a voice mail service or the like, by providing a call waiting signal or tones to the EUT 10, etc. However, when the facility 20 is equipped or provisioned with the mid-call hand-off service 22 (i.e., as shown in FIG. 1), the service 22 provides a mechanism whereby the second party is connected to the second call so as to effectively hand-off the first call from the EUT 10 to the EUT 12 which originated the second call.

In short, mid-call hand-off service 22 operates when the facility 20 receives a second call for the EUT 10 while the subscriber is already using the EUT 10 to participate in a first call with a second party. Suitably, whether or not a mid-call hand-off is in fact carried out, depends on where the second call originates from. As can be appreciated, if the second call is merely from some arbitrary third party that coincidentally happens to be calling, then the second call does not provoke a mid-call hand-off, as is to be expected. On the other hand, if the second call originates from an EUT that the facility 20 associates with the subscriber (e.g., the second call originates from the EUT 12, and the facility 20 recognizes from the DN of the EUT 12 that the EUT 12 belongs to or is otherwise associated with the subscriber because the subscriber has previously supplied the DB 26 and/or the facility 20 with the DN of the EUT 12); then it is reasonable to conclude that the second call from the recognized EUT 12 is likely to have been placed by the subscriber, at least insomuch as the subscriber owns or is associated with the EUT 12. However, the facility 20 also knows that the EUT 10 (also owned by and/or associated with the subscriber) continues to be used to participate in the first call, and it is likewise reasonable to conclude that the subscriber is also participating in the first call insomuch as the first call is connected to the subscriber's EUT 10. Therefore, the second call (presumed to have been placed by the subscriber) is interpreted by the facility 20 as a request or instruction from the subscriber to carry out a mid-call hand-off, and in response thereto, the facility 20 bridges the second party from the first call to the second call. As can be appreciated, the second call is already connected to the EUT 12 from which the second call originated. Accordingly, provided that in fact the subscriber has placed the second call from the EUT 12, the parties are again or otherwise remain connected with one another, while the subscriber has been effectively handed-off from the EUT 10 to the EUT 12.

Figure 2:
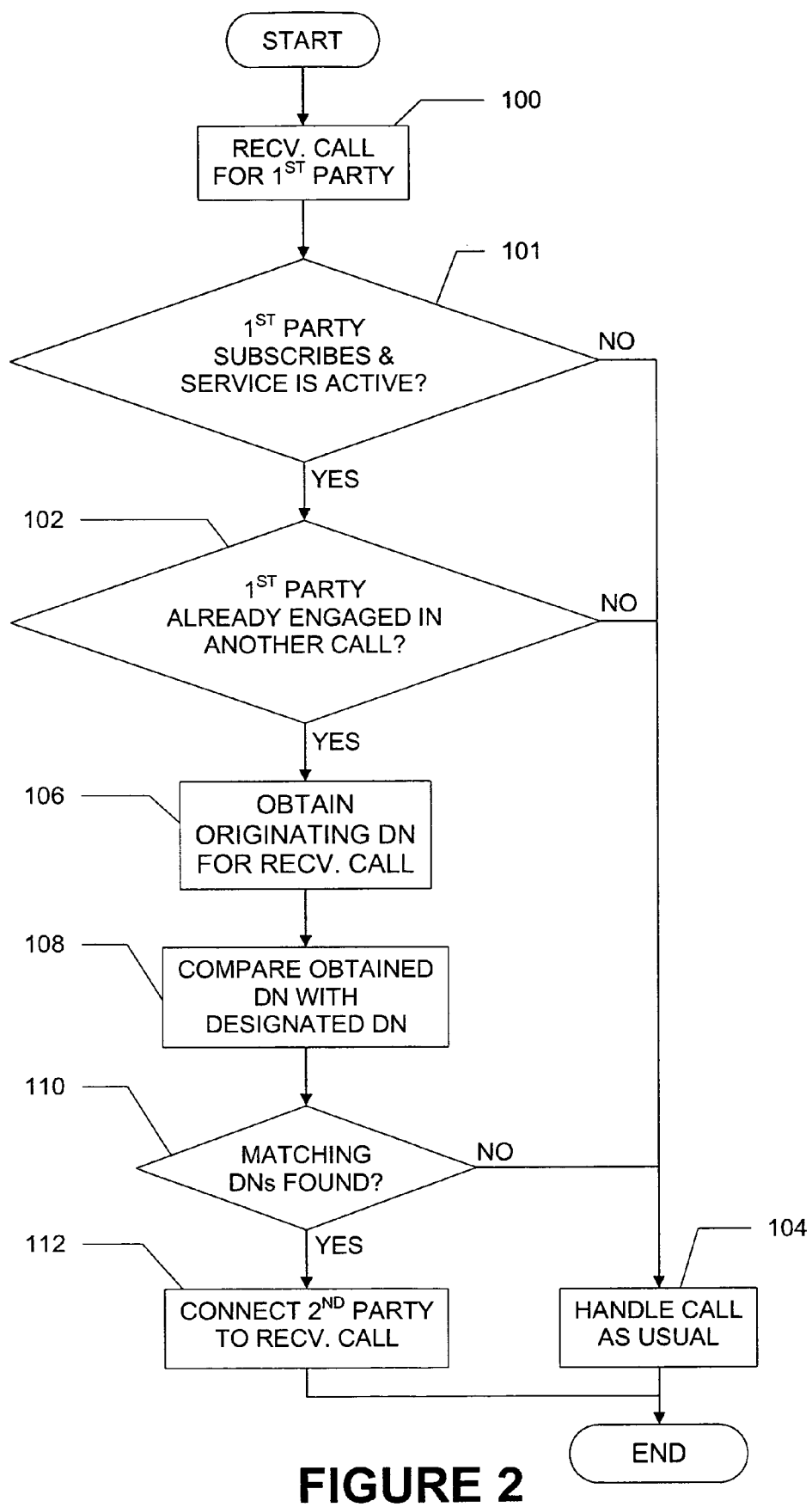
FIG. 2 is a flow chart showing an exemplary mid-call hand-off process embodying aspects of the present inventive subject matter.

More specifically, with reference to FIG. 2, an exemplary process illustrating the operation of the mid-call hand-off service 22 will now be described. The process starts at step 100 with the facility 20 receiving a call for a first party employing the EUT 10, e.g., the received call originating from the EUT 12. At decision step 101, it is determined if the first party has a proper subscription of the mid-call hand-off service 22 and/or if the service 22 is activated. Suitably, the facility 20 queries the DB 26 to obtain the relevant subscription and/or activation status for the first party. If the first party does not subscribe to the service 22 or the service 22 is not activated for the EUT 10, then the process continues to step 104 wherein call processing is conducted normally. Otherwise, if there is a proper subscription and/or that the mid-call hand-off service 22 is activated for the EUT 10, then the process continues to step 102.

At decision step 102, it is determined if the EUT 10 is currently engaged or already participating in another call with a second party. For example, the facility 20 optionally checks the EUT 10 and/or its line to see if it is already busy or currently active. If it is determined that the EUT 10 is available (i.e., not busy or not already engaged in another call), then the process continues to step 104 wherein call processing is conducted normally. For example, in this case, the call from step 100 received by the facility 20 for the EUT 10 is optionally connected to the EUT 10 or the EUT 10 is otherwise alerted of the incoming call in the usual fashion.

Note that when the EUT 10 is not already participating in a call, it is reasonable to conclude that the received call from step 100 is not intended to invoke the mid-call hand-off service 22 insomuch as there is currently no call to hand-off, at least not one in which the EUT 10 is engaged. On the other hand, if it is determined at step 102 that the EUT 10 is busy or already engaged in another call, then the process continues to step 106. In this case, the received call from step 100 is potentially intended to invoke the mid-call hand-off service 22.

At step 106, the originating DN for the received call from step 100 is obtained. For example, the service 24 (such as an ANI service, a CLI feature, etc.) is employed to determine and/or capture the DN of the EUT from which the received call originated. The obtained DN from step 106 is then compared to one or more designated DNs, as indicated in step 108. Suitably, the designated DNs have been previously provisioned in and/or provided to the subscriber DB 26 and/or the facility 20 by the user as desired, these designated DNs corresponding to those EUTs which the user selects to be eligible to receive mid-call hand-offs via the service 22. For example, the designated DNs optionally correspond to the other EUTs owned or commonly used by the subscriber, e.g., such as the EUT 12.

At decision step 110, it is determined if there is a suitable match between the obtained DN from step 106 and a designated DN. If there is no suitable match, then the process continues to step 104 wherein call processing is conducted normally. This is the case where the received call from step 100 is deemed to be from some arbitrary third party and it is handled accordingly, e.g., the party originating the received call from step 100 is optionally returned a busy signal or other like call progress tones; alternately, the call from step 100 received by the facility 20 for the EUT 10 is optionally forwarded to a voice mail service or the like; optionally, the EUT 10 is provided a call waiting signal or other suitable tones; etc. On the other hand, if a suitable match is found, then the process continues to step 112. This is the case where the received call from step 100 is presumed to be from the subscriber and taken by the facility 20 as a request or instruction to carry out a mid-call hand-off. Accordingly, at step 112, the second party is bridged or otherwise connected to the received call from step 100. Optionally, after the second party has been connected with the newly received call from step 100, the prior call (i.e., the "already existing call" detected in step 102 between the parties) is torn down, dropped or otherwise released.

As can be appreciated from the examples herein and the illustrated embodiments, the mid-call hand-off feature can be successfully implemented even if the switching facility 30 serving the EUT 12 which is to receive the hand-off does not support such a feature, so long a the facility 20 serving the EUT 10 from which the hand-off is being made does support the feature. Accordingly, roll out of the feature is not strictly contingent upon widespread adoption or universal implementation among switching facilities.

Figure 3:
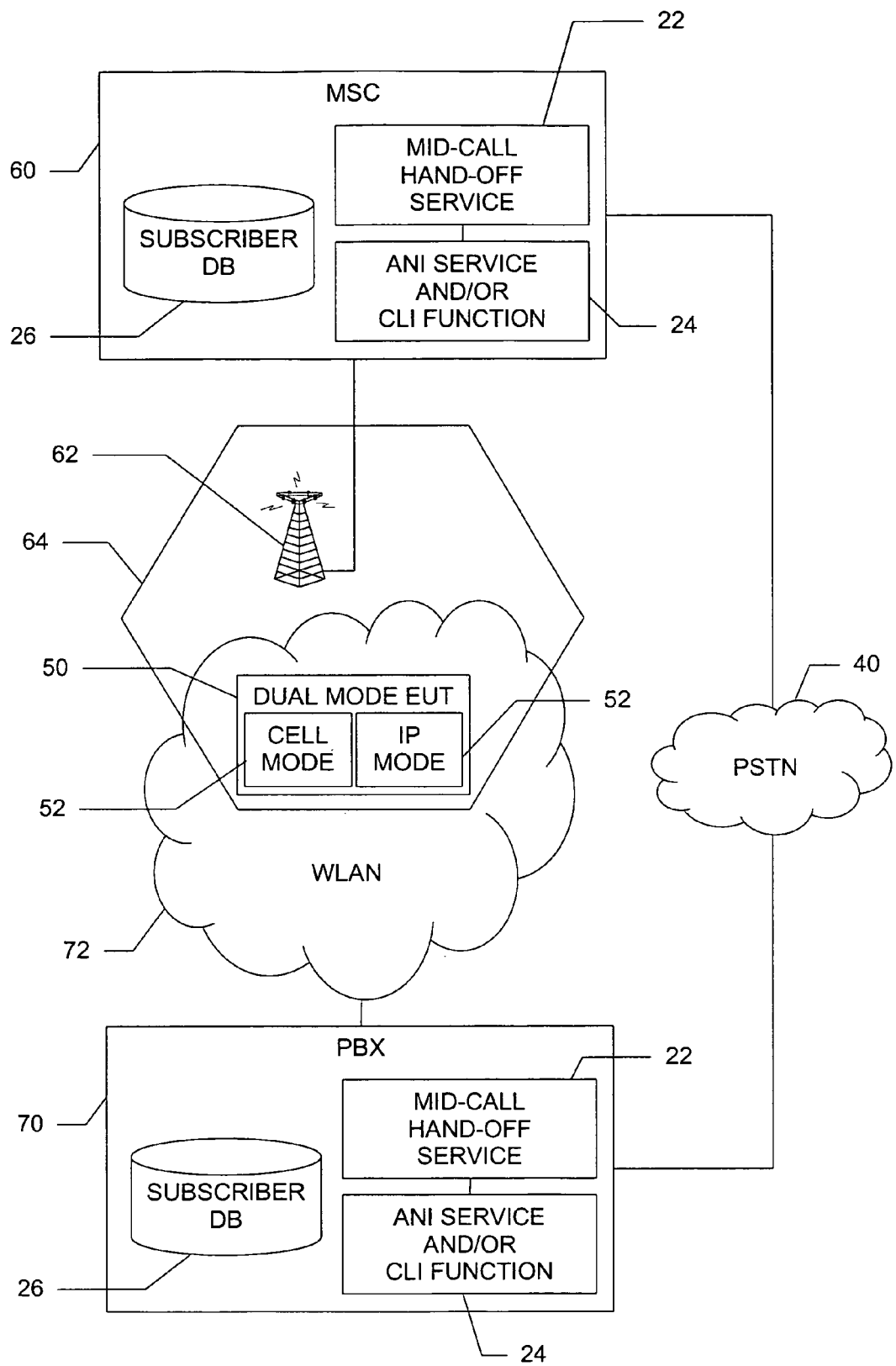
FIG. 3 is a block diagram illustrating another exemplary telecommunications network suitable for practicing aspects of the present inventive subject matter in a more specific manner.

With reference to FIG. 3, the illustrated EUT 50 is a dual mode mobile device including, e.g., a first cellular terminal portion 52 and a second IP based terminal portion 54. Suitably, the first portion 52 of the EUT 50 is implemented as and/or provisioned in similar fashion to any conventional cellular MS; and, the second portion 54 of the EUT 50 is implemented as a VoIP device or other like device equipped to communicate over a wireless network such as a WLAN. Optionally, the second portion 54 may be an IP based hard phone or a soft phone running on an appropriate platform, computer or the like. The EUT 50 is alternately served or provided access to the PSTN 40 via one of two different switching facilities. Suitably, either or both of the two different switching facilities are equipped similarly to the switching facility 20, i.e., with mid-call hand-off services 22, originating DN identification services 24, and subscriber DBs 26.

As shown, a first of the two switching facilities (which serves the first portion 52 of the EUT 50) is implemented as a mobile switching center 60 that is operatively connected to and/or in communication with the PSTN 40 in the usual manner. Suitably, the MSC 60 is also operatively connected to and/or in communication with a plurality of base stations in the usual manner. As is understood in the cellular telecommunication art, each base station (BS) (such as the illustrated BS 62) provides an over-the-air radio frequency interface for its respective geographic area or cell 64. Selectively, the served portion of the EUT 50 is provided telecommunication services and/or otherwise accesses the network via the interface and/or the BS 62 serving the cell 64 in which the EUT 50 is located.

Optionally, a second of the two switching facilities (which serves the second portion 54 of the EUT 50) is implemented as a PBX 70 that is operatively connected to and/or in communication with the PSTN 40 in the usual manner. As shown, a WLAN 72 provides wireless extensions of the PBX 70 to the served IP based terminal portion 54 of the EUT 50. Suitably, the IP based terminal portion 54 of the EUT 50 is provisioned with or otherwise has access to a wireless network card or similar equipment that provides wireless connectivity to the WLAN 72. Alternately, some other suitable implementation is employed to provide a connection or bridge between the WLAN 72 and the PSTN 40, e.g., a soft switch, or an IP gateway in combination with a hard switch, etc.

Suitably, the first and second portions 52 and 54 of the EUT 50 have different DNs assigned or otherwise associated therewith, namely, a first DN which corresponds to the first terminal portion 52 and a second DN which corresponds to the second terminal portion 54. For example, these first and second DNs are programmed or otherwise provisioned in the EUT 50. Optionally, the DN for each portion of the EUT 50 is also programmed or otherwise provisioned in one of the two switching facilities that serves the opposite portion. For example, this is suitably accomplished as described above with regard to the switching facility 20.

More specifically, the first DN, e.g., is stored as a designated DN in the DB 26 of the second facility along with the other registration and/or subscription information associated with the second terminal portion 54 of the EUT 50. Similarly, the second DN, e.g., is stored as a designated DN in the DB 26 of the first facility along with the other registration and/or subscription information associated with the first terminal portion 54 of the EUT 50.

Accordingly, by utilizing the mid-call hand-off service 22 as described herein, the first and second switching facilities are equipped to hand-off calls between the first and second portions 52 and 54 of the EUT 50. In other words, as shown in FIG. 3, when there is overlapping coverage between the cellular network (as represented here by the cell 64) and the WLAN 72, a user of the dual mode EUT 50 can selectively take a first call with a second party currently being conducted over the cellular network via the first portion 52 of the EUT 50, and hand it off to be conducted over the WLAN 72 using the second portion 54 of the EUT 50, e.g., by placing a second call from the second portion 54 of the EUT 50 to the first DN associated with the first portion 52 of the EUT 50. It is to be appreciated, that when the first switching facility receives the second call directed to the first DN, the first call is still in progress; and, upon obtain the originating DN of the second call, the first facility will recognize the obtained DN as being a match to the second DN which had been previously provisioned in the first facility. Accordingly, the second facility will interpret the second call as a request or instruction to carry out a mid-call hand-off, thereby bridging or otherwise connecting the second party to the second call, which as it turns out, is being conducted over the WLAN 72 via the second part 54 of the EUT 50. Similarly, the user of the dual mode EUT 50 has the option to selectively switch a call from the WLAN 72 to the cellular network.

Optionally, rather than the user manually dialing the second call to switch networks, the EUT 50 is equipped with a button and/or provisioned with a "switch network function" that automates the appropriate dialing and other adjunct processes to effect the forgoing described network switch when the button is pressed or the feature is otherwise selected. In this manner, the user of the dual mode EUT 50 may readily select to switch a call already in progress from one network to the other as they desire without substantially interrupting the call.

In yet another exemplary embodiment, the network switching procedure or mid-call hand-off feature described with respect to the dual mode EUT 50 is automatically performed in response to the detection of one or more call conditions. For example, if the EUT 50 detects that a signal strength for the network currently being used to conduct call is weak, fading, about to be lost and/or is less than a detected signal strength in the other network, then the EUT 50 optionally switches the call to the other network automatically by initiating a second call just as if the user had dialed this call manually as previously described. Accordingly, as a user travels in and out of range of the respective first and second networks, a current call can remain connected via automatically executed mid-call hand-offs between the first and second portions 52 and 54 of the dual mode EUT 50.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of providing a mid-call feature in a telecommunications network, the method comprising:
    (a) connecting a first call through a first switching facility of the telecommunications network such that a first party using a first end user terminal served by the first switching facility and a second party are participating in the first call;

(b) receiving a second call originating from a second end user terminal for the first end user terminal at the first switching facility while the first call is still connected;

(c) obtaining an originating telephone number associated with the second end user terminal for the second call at the first switching facility;

(d) comparing the originating telephone number to at least one designated telephone number at the first switching facility, wherein each designated telephone number is associated with one or more end user terminal previously designated by the first party as a candidate for a mid-call feature; and, (e) connecting the second party to the second call at the first switching facility when the originating telephone number matches any designated telephone number while the second party remains connected to the first end user terminal via the first call.

2. The method of claim 1, further comprising:
releasing the first end user terminal from the first call after the second party is connected to the second call.

3. The method of claim 1, wherein step (c) comprises:
capturing the originating telephone number associated with the second end user terminal using at least one of an automatic number identification service and a calling line identity feature.

4. The method of claim 1, further comprising:
not connecting the second party to the second call when the originating telephone number does not match any designated telephone number.

5. The method of claim 1, further comprising:
provisioning the first switching facility with the at least one designated telephone number prior to step (a).

6. The method of claim 1, wherein the second call originates from a second switching facility serving the second end user terminal which is different than the first switching facility.

7. The method of claim 6, wherein the first end user terminal is combined with the second end user terminal in a dual mode terminal including:
a first mode via which the dual mode terminal selectively connects with calls through the first switching facility, said first mode of the dual mode terminal being used by the first party for the first call; and,
a second mode via which the dual mode terminal selectively connects with calls through the second switching facility, said second mode of the dual mode terminal being used to originate the second call.

8. The method of claim 7, wherein the second call is placed automatically by the dual mode terminal in response to a detected call condition.

9. The method of claim 8, wherein the detected call condition is low signal strength or a loss of signal in the first mode.

10. The method of claim 1 wherein the first and second end user terminals are associated with the first party.

11. A system for providing a mid-call feature in a telecommunications network, the system comprising:
a first switching facility, comprising:
connecting means for connecting a first call through the first switching facility of the telecommunications network such that a first party using a first end user terminal served by the first switching facility and a second party are participating in the first call;
receiving means for receiving a second call originating from a second end user terminal for the first end user terminal at the first switching facility while the first call is still connected;
obtaining means for obtaining an originating telephone number associated with the second end user terminal for the second call;
comparing means for comparing the originating telephone number to at least one designated telephone number, wherein each designated telephone number is associated with one or more end user terminal previously designated by the first party as a candidate for a mid-call feature; and,
bridging means for bridging the second party to the second call when the originating telephone number matches any designated telephone number while the second party remains connected to the first end user terminal via the first call.

12. The system of claim 11, the first switching facility further comprising:
releasing means for releasing the first end user terminal from the first call after the second party is bridged to the second call.

13. The system of claim 11, wherein the determining means comprise at least one of an automatic number identification service or a calling line identity feature to capture the originating telephone number associated with the second end user terminal.

14. The system of claim 11, further comprising:
storage means for storing the at least one designated telephone number so as to be accessible by the comparing means.

15. The system of claim 11, further comprising:
a second switching facility in operative communication with the first switching facility and serving the second end user terminal, wherein the second call originates from the second switching facility.

16. The system of claim 15, wherein the first end user terminal is combined with the second end user terminal in a dual mode terminal, the dual mode terminal including:
a first mode via which the dual mode terminal selectively connects with calls through the first switching facility, said first mode of the dual mode terminal being used by the first party for the first call; and,
a second mode via which the dual mode terminal selectively connects with calls through the second switching facility, said second mode of the dual mode terminal being used to originate the second call.

17. The system of claim 16, wherein the second call is placed automatically by the dual mode terminal in response to a detected call condition.

18. The system of claim 15 wherein the first switching facility supports the mid-call feature and the second switching facility does not support the mid-call feature.

19. A method of providing mid-call transfer service in a telecommunications network, the method comprising:
a) connecting a first call through a first switching facility of the telecommunications network such that a first party using a first end user terminal served by the first switching facility and a second party are participating in the first call;
b) receiving a second call originating from a second end user terminal for the first end user terminal at the first switching facility while the first call is still connected;
c) capturing an originating directory number associated with the second end user terminal for the second call at the first switching facility;

d) determining the first party is a subscriber to the mid-call transfer service;
e) comparing the originating directory number to one or more designated directory numbers at the first switching facility in relation to the mid-call transfer service, wherein each designated directory number is associated with one or more end user terminal previously designated by the first party as a candidate to participate in the mid-call transfer service;
f) connecting the second party to the second call at the first switching facility when the originating telephone number matches any designated telephone number while the second party remains connected to the first end user terminal via the first call; and
g) tearing down the first call at the first switching facility to complete a mid-call transfer from the first end user terminal to the second end user terminal in relation to the second party.

20. The method of claim 19 wherein the one or more designated directory numbers are associated with the first party.

* * * * *